US008349039B2

(12) United States Patent  
Robinson

(10) Patent No.: US 8,349,039 B2
(45) Date of Patent: Jan. 8, 2013

(54) CARBONACEOUS FINES RECYCLE

(75) Inventor: Earl T. Robinson, Lakeland, FL (US)

(73) Assignee: GreatPoint Energy, Inc., Cambridge, MA (US)

( * ) Notice: Subject to any disclaimer, the term of this patent is extended or adjusted under 35 U.S.C. 154(b) by 821 days.

(21) Appl. No.: 12/395,385

(22) Filed: Feb. 27, 2009

(65) Prior Publication Data

US 2009/0217589 A1 Sep. 3, 2009

Related U.S. Application Data

(60) Provisional application No. 61/032,717, filed on Feb. 29, 2008.

(51) Int. Cl.
*C01B 31/20* (2006.01)
*C01B 31/18* (2006.01)
*C01B 17/16* (2006.01)
*C01B 3/38* (2006.01)
*C01B 3/32* (2006.01)
*C01C 1/02* (2006.01)
*C08K 3/00* (2006.01)

(52) U.S. Cl. ............ 48/197 R; 252/182.13; 252/182.32; 423/352; 423/418.2; 423/437.1; 423/564; 423/580.1; 423/648.1; 423/652; 585/700; 585/733

(58) Field of Classification Search .................. 700/271, 700/266, 268; 422/55, 626; 48/197 R–197 A; 252/182.13, 182.32; 423/437.1, 580.1, 352, 423/564, 648.1, 652, 418.2; 585/700, 733
See application file for complete search history.

(56) References Cited

U.S. PATENT DOCUMENTS

| | | | |
|---|---|---|---|
| 2,694,623 A | 11/1954 | Welty, Jr. et al. |
| 2,791,549 A | 5/1957 | Jahnig |
| 2,813,126 A | 11/1957 | Tierney |
| 2,860,959 A | 11/1958 | Pettyjohn et al. |
| 2,886,405 A | 5/1959 | Benson et al. |
| 3,034,848 A | 5/1962 | King |
| 3,114,930 A | 12/1963 | Oldham et al. |
| 3,164,330 A | 1/1965 | Neidl |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovish et al. |
| 4,077,778 A | 3/1978 | Nahas et al. |
| 4,091,073 A | 5/1978 | Winkler |

(Continued)

FOREIGN PATENT DOCUMENTS

CA 966660 4/1975

(Continued)

OTHER PUBLICATIONS

Sigma-Aldrich "Particle Size Conversion Table" 2004. http://www.sigmaaldrich.com/chemistry/stockroom-reagents/learning-center/technical-library/particle-size-conversion.printerview.html.*
A.G. Collot et al., "Co-pyrolysis and co-gasification of coal and biomass in bench-scale fixed-bed and fluidized bed reactors", (1999) Fuel 78, pp. 667-679.
Wenkui Zhu et al., "Catalytic gasification of char from co-pyrolysis of coal and biomass", (2008) Fuel Processing Technology, vol. 89, pp. 890-896.
Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.
Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.

(Continued)

*Primary Examiner* — Wayne Langel
*Assistant Examiner* — Syed Iqbal
(74) *Attorney, Agent, or Firm* — McDonnell Boehnen Hulbert & Berghoff LLP

(57) ABSTRACT

Processes are provided for capturing and recycling carbonaceous fines generated during a gasification process. In particular, the recycled fines are processed into a particulate composition which is useable as a carbonaceous feedstock and is conversion into a gas stream comprising methane.

11 Claims, No Drawings

U.S. PATENT DOCUMENTS

| | | | |
|---|---|---|---|
| 4,092,125 A | 5/1978 | Stambaugh et al. | |
| 4,094,650 A | 6/1978 | Koh et al. | |
| 4,100,256 A | 7/1978 | Bozzelli et al. | |
| 4,101,449 A | 7/1978 | Noda et al. | |
| 4,104,201 A | 8/1978 | Banks et al. | |
| 4,113,615 A | 9/1978 | Gorbaty | |
| 4,116,996 A | 9/1978 | Huang | |
| 4,118,204 A | 10/1978 | Eakman et al. | |
| 4,152,119 A | 5/1979 | Schulz | |
| 4,157,246 A | 6/1979 | Eakman et al. | |
| 4,159,195 A | 6/1979 | Clavenna | |
| 4,162,902 A | 7/1979 | Wiesner et al. | |
| 4,173,465 A | 11/1979 | Meissner et al. | |
| 4,189,307 A | 2/1980 | Marion | |
| 4,193,771 A | 3/1980 | Sharp et al. | |
| 4,193,772 A | 3/1980 | Sharp | |
| 4,200,439 A | 4/1980 | Lang | |
| 4,204,843 A | 5/1980 | Neavel | |
| 4,211,538 A * | 7/1980 | Eakman et al. | 48/197 R |
| 4,211,669 A | 7/1980 | Eakman et al. | |
| 4,219,338 A | 8/1980 | Wolfs et al. | |
| 4,225,457 A | 9/1980 | Schulz | |
| 4,235,044 A | 11/1980 | Cheung | |
| 4,243,639 A | 1/1981 | Haas et al. | |
| 4,249,471 A | 2/1981 | Gunnerman | |
| 4,252,771 A | 2/1981 | Lagana et al. | |
| 4,260,421 A | 4/1981 | Brown et al. | |
| 4,265,868 A | 5/1981 | Kamody | |
| 4,270,937 A | 6/1981 | Adler et al. | |
| 4,284,416 A | 8/1981 | Nahas | |
| 4,292,048 A | 9/1981 | Wesselhoft et al. | |
| 4,298,584 A | 11/1981 | Makrides | |
| 4,315,753 A | 2/1982 | Bruckenstein et al. | |
| 4,315,758 A | 2/1982 | Patel et al. | |
| 4,318,712 A | 3/1982 | Lang et al. | |
| 4,322,222 A | 3/1982 | Sass | |
| 4,330,305 A | 5/1982 | Kuessner et al. | |
| 4,331,451 A | 5/1982 | Isogaya et al. | |
| 4,334,893 A | 6/1982 | Lang | |
| 4,336,034 A * | 6/1982 | Lang et al. | 48/202 |
| 4,336,233 A | 6/1982 | Appl et al. | |
| 4,344,486 A | 8/1982 | Parrish | |
| 4,347,063 A | 8/1982 | Sherwood et al. | |
| 4,348,486 A | 9/1982 | Calvin et al. | |
| 4,348,487 A | 9/1982 | Goldstein et al. | |
| 4,353,713 A | 10/1982 | Cheng | |
| 4,365,975 A | 12/1982 | Williams et al. | |
| 4,372,755 A | 2/1983 | Tolman et al. | |
| 4,375,362 A | 3/1983 | Moss | |
| 4,397,656 A | 8/1983 | Ketkar | |
| 4,400,182 A | 8/1983 | Davies et al. | |
| 4,407,206 A | 10/1983 | Bartok et al. | |
| 4,428,535 A | 1/1984 | Venetucci | |
| 4,432,773 A | 2/1984 | Euker, Jr. et al. | |
| 4,433,065 A | 2/1984 | Van Der Burgt et al. | |
| 4,436,028 A | 3/1984 | Wilder | |
| 4,436,531 A | 3/1984 | Estabrook et al. | |
| 4,439,210 A | 3/1984 | Lancet | |
| 4,444,568 A | 4/1984 | Beisswenger et al. | |
| 4,459,138 A | 7/1984 | Soung | |
| 4,462,814 A | 7/1984 | Holmes et al. | |
| 4,466,828 A | 8/1984 | Tamai et al. | |
| 4,468,231 A | 8/1984 | Bartok et al. | |
| 4,478,425 A | 10/1984 | Benko | |
| 4,478,725 A | 10/1984 | Velling et al. | |
| 4,482,529 A | 11/1984 | Chen et al. | |
| 4,491,609 A | 1/1985 | Degel et al. | |
| 4,497,784 A | 2/1985 | Diaz | |
| 4,500,323 A | 2/1985 | Siegfried et al. | |
| 4,505,881 A | 3/1985 | Diaz | |
| 4,508,544 A | 4/1985 | Moss | |
| 4,508,693 A | 4/1985 | Diaz | |
| 4,515,604 A | 5/1985 | Eisenlohr et al. | |
| 4,515,764 A | 5/1985 | Diaz | |
| 4,524,050 A | 6/1985 | Chen et al. | |
| 4,540,681 A | 9/1985 | Kustes et al. | |
| 4,541,841 A | 9/1985 | Reinhardt | |
| 4,551,155 A | 11/1985 | Wood et al. | |
| 4,558,027 A | 12/1985 | McKee et al. | |
| 4,572,826 A | 2/1986 | Moore | |
| 4,594,140 A | 6/1986 | Cheng | |
| 4,597,775 A | 7/1986 | Billimoria et al. | |
| 4,597,776 A | 7/1986 | Ullman et al. | |
| 4,604,105 A | 8/1986 | Aquino et al. | |
| 4,609,388 A | 9/1986 | Adler et al. | |
| 4,609,456 A | 9/1986 | Deschamps et al. | |
| 4,617,027 A | 10/1986 | Lang | |
| 4,619,864 A | 10/1986 | Hendrix et al. | |
| 4,620,421 A | 11/1986 | Brown et al. | |
| 4,661,237 A | 4/1987 | Kimura et al. | |
| 4,668,428 A | 5/1987 | Najjar | |
| 4,668,429 A | 5/1987 | Najjar | |
| 4,675,035 A | 6/1987 | Apffel | |
| 4,678,480 A | 7/1987 | Heinrich et al. | |
| 4,682,986 A | 7/1987 | Lee et al. | |
| 4,690,814 A | 9/1987 | Velenyi et al. | |
| 4,699,632 A | 10/1987 | Babu et al. | |
| 4,704,136 A | 11/1987 | Weston et al. | |
| 4,720,289 A | 1/1988 | Vaugh et al. | |
| 4,747,938 A | 5/1988 | Khan | |
| 4,781,731 A | 11/1988 | Schlinger | |
| 4,803,061 A | 2/1989 | Najjar et al. | |
| 4,808,194 A | 2/1989 | Najjar et al. | |
| 4,810,475 A | 3/1989 | Chu et al. | |
| 4,822,935 A | 4/1989 | Scott | |
| 4,848,983 A | 7/1989 | Tomita et al. | |
| 4,854,944 A | 8/1989 | Strong | |
| 4,861,346 A | 8/1989 | Najjar et al. | |
| 4,861,360 A | 8/1989 | Apffel | |
| 4,872,886 A | 10/1989 | Henley et al. | |
| 4,876,080 A | 10/1989 | Paulson | |
| 4,892,567 A | 1/1990 | Yan | |
| 4,960,450 A | 10/1990 | Schwarz et al. | |
| 4,995,193 A | 2/1991 | Soga et al. | |
| 5,017,282 A | 5/1991 | Delbianco et al. | |
| 5,055,181 A | 10/1991 | Maa et al. | |
| 5,057,294 A | 10/1991 | Sheth et al. | |
| 5,059,406 A | 10/1991 | Sheth et al. | |
| 5,093,094 A | 3/1992 | Van Kleeck et al. | |
| 5,094,737 A | 3/1992 | Bearden, Jr. et al. | |
| 5,132,007 A | 7/1992 | Meyer et al. | |
| 5,223,173 A | 6/1993 | Jeffrey | |
| 5,236,557 A | 8/1993 | Muller et al. | |
| 5,250,083 A | 10/1993 | Wolfenbarger et al. | |
| 5,277,884 A | 1/1994 | Shinnar et al. | |
| 5,435,940 A | 7/1995 | Doering et al. | |
| 5,536,893 A | 7/1996 | Gudmundsson | |
| 5,616,154 A | 4/1997 | Elliott et al. | |
| 5,630,854 A | 5/1997 | Sealock, Jr. et al. | |
| 5,641,327 A | 6/1997 | Leas | |
| 5,660,807 A | 8/1997 | Forg et al. | |
| 5,670,122 A | 9/1997 | Zamansky et al. | |
| 5,720,785 A | 2/1998 | Baker | |
| 5,733,515 A | 3/1998 | Doughty et al. | |
| 5,769,165 A | 6/1998 | Bross et al. | |
| 5,776,212 A | 7/1998 | Leas | |
| 5,788,724 A | 8/1998 | Carugati et al. | |
| 5,855,631 A | 1/1999 | Leas | |
| 5,865,898 A | 2/1999 | Holtzapple et al. | |
| 5,968,465 A | 10/1999 | Koveal et al. | |
| 6,013,158 A | 1/2000 | Wootten | |
| 6,015,104 A | 1/2000 | Rich, Jr. | |
| 6,028,234 A | 2/2000 | Heinemann et al. | |
| 6,090,356 A | 7/2000 | Jahnke et al. | |
| 6,132,478 A | 10/2000 | Tsurui et al. | |
| 6,180,843 B1 | 1/2001 | Heinemann et al. | |
| 6,187,465 B1 | 2/2001 | Galloway | |
| 6,379,645 B1 | 4/2002 | Bucci et al. | |
| 6,389,820 B1 | 5/2002 | Rogers et al. | |
| 6,506,349 B1 | 1/2003 | Khanmamedov | |
| 6,506,361 B1 | 1/2003 | Machado et al. | |
| 6,602,326 B2 | 8/2003 | Lee et al. | |
| 6,641,625 B1 | 11/2003 | Clawson et al. | |
| 6,653,516 B1 | 11/2003 | Yoshikawa et al. | |
| 6,692,711 B1 | 2/2004 | Alexion et al. | |
| 6,790,430 B1 | 9/2004 | Lackner et al. | |
| 6,797,253 B2 | 9/2004 | Lyon | |

| | | |
|---|---|---|
| 6,808,543 B2 | 10/2004 | Paisley |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,118,720 B1 | 10/2006 | Mendelsohn et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2005/0287056 A1 | 12/2005 | Baker et al. |
| 2006/0228290 A1 | 10/2006 | Green |
| 2006/0265953 A1 | 11/2006 | Hobbs |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovister et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |

FOREIGN PATENT DOCUMENTS

| | | |
|---|---|---|
| CA | 1003217 | 1/1977 |
| CA | 1041553 | 10/1978 |
| CA | 1106178 | 8/1981 |
| CA | 1 125 026 | 6/1982 |
| CA | 1187702 | 6/1985 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |

| | | |
|---|---|---|
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | WO 2010/132551 | 11/2010 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | WO 2011/034890 | 3/2011 |
| WO | 2011/063608 | 6/2011 |
| WO | WO 2012/024369 | 2/2012 |

OTHER PUBLICATIONS

Brown et al., "Biomass-Derived Hydrogen From a thermally Ballasted Gasifier", Final Technical Report, Iowa State University, Aug. 2005.
Chiaramonte et al, "Upgrade Coke by Gasification", (1982) Hydrocarbon Processing, vol. 61 (9), pp. 255-257 (Abstract only).
Asami, K., et al., "Highly Active Iron Catalysts from Ferric Chloride or the Steam Gasification of Brown Coal," ind. Eng. Chem. Res., vol. 32, No. 8, 1993, pp. 1631-1636.
Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.
Brown et al., "Biomass-Derived Hydrogen From a Thermally Ballasted Gasifier," Aug. 2005.
Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.
Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.
Kalina, T., Nahas, N.C., Project Managers, "Exxon Cataylatic Coal Gasification Process Predevelopment Program," Exxon Research & Engineering Company, FE-2369-24, U.S. Dept. of Energy, Contract No. E(49-18)-2369, 1978.
Nahas, N.C., "Exxon Catalytic Coal Gasification Process—Fundamentals to Flowsheets," Fuel, vol. 62, No. 2, 1983, pp. 239-241.
Ohtsuka, Y. et al., "Highly Active Catalysts from Inexpensive Raw Materials for Coal Gasification," Catalysis Today, vol. 39, 1997, pp. 111-125.
Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.
Ohtsuka, Yasuo et al., "Calcium Catalysed Steam Gasification of Yalourn Brown Coal," Fuel, vol. 65, 1986, pp. 1653-1657.
Ohtsuka, Yasuo, et al., "Iron-Catalyzed Gasification of Brown Coal at Low Temperatures," Energy & Fuels, vol. 1, No. 1, 1987, pp. 32-36.
Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.
Ohtsuka, Yasuo et al., "Steam Gasification of Coals with Calcium Hydroxide," Energy & Fuels, vol. 9, No. 6, 1995, pp. 1038-1042.
Pereira, P., et al., "Catalytic Steam Gasification of Coals," Energy & Fuels, vol. 6, No. 4, 1992, pp. 407-410.
Ruan Xiang-Quan, et al., "Effects of Catalysis on Gasification of Tatong Coal Char," Fuel, vol. 66, Apr. 1987, pp. 568-571.
Tandon, D., "Low Temperature and Elevated Pressure Steam Gasification of Illinois Coal," College of Engineering in the Graduate School, Southern Illinois university at Carbondale, Jun. 1996.
U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.

Jensen, et al. Removal of K and Cl by leaching of straw char, *Biomass and Bioenergy*, vol. 20, pp. 447-457, (2001).

Meyers, et al. Fly Ash as a Construction Material for Highways, A Manual. Federal Highway Administration, Report No. FHWA-IP-76-16, Washington, DC, 1976.

Natural Gas Processing: The Crucial Link Between Natural Gas Production and Its Transportation to Market. Energy Information Administration, Office of Oil and Gas; pp. 1-11, (2006).

Prins, et al., "Exergetic optimisation of a production process of Fischer-Tropsch fuels from biomass", *Fuel Processing Technology*, vol. 86, pp. 375-389, (2004).

Moulton, Lyle K. "Bottom Ash and Boiler Slag", *Proceedings of the Third International Ash Utilization Symposium*, U.S. Bureau of Mines, Information Circular No. 8640, Washington, DC, 1973.

Adsorption, http://en.wikipedia.org/wiki/Adsorption, pp. 1-8 (Oct. 17, 2007).

Amine gas treating, http://en.wikipedia.org/wiki/Acid_gas_removal, pp. 1-4 (Oct. 21, 2007).

Coal, http://en.wikipedia.org/wiki/Coal_gasification, pp. 1-8 (Oct. 29, 2007).

Fluidized Bed Gasifiers, http://www.energyproducts.com/fluidized_bed_gasifiers.htm, pp. 1-5 (Oct. 24, 2007).

Gas separation, http://en.wikipedia.org/wiki/Gas_separation, pp. 1-2 (Feb. 24, 2007).

Gasification, http://en.wikipedia.org/wiki/Gasification, pp. 1-6 (Oct. 29, 2007).

Mengjie, et al., "A potential renewable energy resource development and utilization of biomass energy", http://www.fao.org.docrep/T4470E/t4470e0n.htm, pp. 1-8 (1994).

Natural gas processing, http://en.wikipedia.org/wiki/Natural_gas_processing, pp. 1-4 (Oct. 22, 2007).

Reboiler, http://en.wikipedia.org/wiki/Reboiler, pp. 1-4 (Nov. 11, 2007).

What is XPS?, http://www.nuance.northwestern.edu/KeckII/xps1.asp, pp. 1-2 (2006).

2.3 Types of gasifiers, http://www.fao.org/docrep/t0512e/T0512e0a.htm, pp. 1-6 (1986).

2.4 Gasification fuels, http://www.fao.org/docrep/t0512e/T0512e0b.htm#TopofPage, pp. 1-8 (1986).

2.5 Design of downdraught gasifiers, http://www.fao.org/docrep/t0512e/T0512e0c.htm#TopOfPage, pp. 1-8 (1986).

2.6 Gas cleaning and cooling, http://www.fao.org/docrep/t0512e0d.htm#TopOFPage, pp. 1-3 (1986).

Gerdes, Kristin, et al., "Integrated Gasification Fuel Cell Performance and Cost Assessment," National Energy Technology Laboratory, U.S. Department of Energy, Mar. 27, 2009, pp. 1-26.

Ghosh, S., et al., "Energy Analysis of a Cogeneration Plant Using Coal Gasification and Solid Oxide Fuel Cell," Energy, 2006, vol. 31, No. 2-3, pp. 345-363.

Jeon, S.K., et al., "Characteristics of Steam Hydrogasification of Wood Using a Micro-Batch Reactor," Fuel, 2007, vol. 86, pp. 2817-2823.

Li, Mu, et al., "Design of Highly Efficient Coal-Based Integrated Gasification Fuel Cell Power Plants," Journal of Power Sources, 2010, vol. 195, pp. 5707-5718.

Prins, M.J., et al., "Exergetic Optimisation of a Production Process of Fischer-Tropsch Fuels from Biomass," Fuel Processing Technology, 2005, vol. 86, No. 4, pp. 375-389.

U.S. Appl. No. 13/484,918, filed May 31, 2012.

U.S. Appl. No. 13/402,022, filed Feb. 22, 2012.

U.S. Appl. No. 13/450,995, filed Apr. 19, 2012.

* cited by examiner

CARBONACEOUS FINES RECYCLE

CROSS-REFERENCE TO RELATED APPLICATIONS

This application claims priority under 35 U.S.C. §119 from U.S. Provisional Application Ser. No. 61/032,717 (filed Feb. 29, 2008), the disclosure of which is incorporated by reference herein for all purposes as if fully set forth.

FIELD OF THE INVENTION

The invention relates to particulate compositions comprising carbonaceous fines recovered from a gasification reaction. The invention also relates to a process for preparing a carbonaceous feedstock comprising the particulate compositions. The invention further relates to a continuous process for converting the particulate compositions to plurality of gaseous products through gasification.

BACKGROUND OF THE INVENTION

In view of numerous factors such as higher energy prices and environmental concerns, the production of value-added gaseous products from lower-fuel-value carbonaceous feedstocks, such as biomass, coal and petroleum coke, is receiving renewed attention. The catalytic gasification of such materials to produce methane and other value-added gases is disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541, 841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1, US2006/0265953A1, US2007/000177A1, US2007/083072A1, US2007/0277437A1 and GB 1599932.

Reaction of lower-fuel-value carbonaceous feedstocks under conditions described in the above references typically yields a crude product gas and a char. The crude product gas typically comprises an amount of entrained carbonaceous fines particles, which are removed from the gas stream. A number of prior known methods are effective for removing carbonaceous fines. Typically these fines are not directly usable, which on the industrial scale, can total to a significant amount of potentially hazardous waste and related disposal costs. Accordingly, the handling, storage and disposal operations of carbonaceous fines waste represent a significant and unproductive expense for the industry.

Thus, there is a need for improved processes and compositions that allow for recovery, recycling, and ultimate conversion of carbonaceous fines, such as entrained carbonaceous fines from the gas effluent after gasification of carbonaceous feedstock, into usable feedstock to generate product gas.

SUMMARY OF THE INVENTION

In a first aspect, the invention provides a particulate composition having a particle distribution size suitable for gasification in a fluidized bed zone, the particulate composition comprising an intimate mixture of (a) a carbonaceous fines material having an average particle size of less than about 45 microns; (b) a particulate carbonaceous feedstock material having a particle distribution size suitable for gasification in a fluidized bed zone; and (c) a gasification catalyst which, in the presence of steam and under suitable temperature and pressure, exhibits gasification activity whereby a plurality of gases comprising methane and one or more of hydrogen, carbon monoxide, carbon dioxide, hydrogen sulfide, ammonia and other higher hydrocarbons are formed from the particulate composition, wherein: (1) the carbonaceous fines material and particulate carbonaceous feedstock are present in the particulate composition at a weight ratio of from about 1:99 to about 99:1; (2) the carbonaceous fines material is physically associated with the particulate carbonaceous feedstock; (3) the carbonaceous fines material and the particulate carbonaceous feedstock each comprise a gasification catalyst; and (4) the gasification catalyst comprises a source of at least one alkali metal and is present in an amount sufficient to provide, in the particulate composition, a ratio of alkali metal atoms to carbon atoms ranging from 0.01 to about 0.08.

In a second aspect, the present invention provides a process for preparing a particulate composition having a particle distribution size suitable for gasification in a fluidized bed zone, the process comprising the steps of: (a) providing a particulate carbonaceous fines material having an average particle size of less than about 45 microns and comprising a gasification catalyst; (b) providing a particulate carbonaceous feedstock material having a particle distribution size suitable for gasification in a fluidized bed zone; (b) contacting the particulate carbonaceous feedstock material with an aqueous medium comprising a gasification catalyst to form a slurry; (c) dewatering the slurry to form a wet cake; (d) mixing the particulate carbonaceous fines material with the wet cake to form a wet particulate composition; and (e) thermally treating the wet particulate composition with a dry inert gas to form a particulate composition, wherein the gasification catalyst comprises a source of at least one alkali metal and is present in an amount sufficient to provide, in the particulate composition, a ratio of alkali metal atoms to carbon atoms ranging from 0.01 to about 0.08.

In a third aspect, the invention provides continuous process for converting a carbonaceous feedstock into a plurality of gaseous products, the process comprising the steps of: (a) preparing a particulate composition in accordance with the first aspect, or in accordance with the process of the second aspect; (b) supplying the particulate composition to a gasifying reactor, the gasifying reactor comprising an internal fines remover, an external fines remover, or both, for removing gas-entrained fines materials; (c) reacting the particulate composition in the gasifying reactor in the presence of steam and under suitable temperature and pressure to form a first gas stream comprising (i) a plurality of gaseous products including methane and at least one or more of hydrogen, carbon monoxide, carbon dioxide, hydrogen sulfide, ammonia and other higher hydrocarbons; and (ii) a gas-entrained carbonaceous fines material; (d) at least partially capturing the gas-entrained carbonaceous fines material in the internal fines remover, external fines remover, or both; (e) recovering the captured carbonaceous fines materials from the internal fines remover, external fines remover, or both; and (f) recycling the captured carbonaceous fines material to the particulate composition preparation of step (a).

DETAILED DESCRIPTION

The present invention relates to particulate compositions having a particle distribution size suitable for gasification in a fluidized bed zone, the particulate composition comprising a mixture of particulate carbonaceous feedstock, carbonaceous fines material recovered from a gasification reaction, and a gasification catalyst which, in the presence of steam and under suitable temperature and pressure, can be converted to a plurality of gases via a gasification reaction. The invention also relates to processes for preparing a particulate composition for gasification, where the particulate composition comprises a particulate carbonaceous feedstock and carbonaceous fines material recovered from a gasification reaction and a gasification catalyst, and mixing the components. The invention further relates to a continuous process for converting a carbonaceous feedstock into a plurality of gaseous products comprising a gasifying reactor including internal and external carbonaceous fines removers, capturing and recovering gas-entrained carbonaceous fines from the internal and external removers for use in preparing a particulate composition useable as a carbonaceous feedstock for the gasifying reactor.

Generally, gasification of a carbonaceous material results in a crude gas stream comprising methane, carbon dioxide, hydrogen, carbon monoxide, hydrogen sulfide, ammonia, unreacted steam, entrained fines, and other contaminants such as COS. Through cleaning operations known to those of skill in the art, the crude gas stream is treated to yield a cleaned gas stream comprising methane, hydrogen, and carbon monoxide. Methane may be used as a clean-burning high-value fuel. Separation processes used to purify the crude gas stream generates inter alia a carbonaceous fines byproduct upon the removal of entrained fines from the stream. Often these carbonaceous fines are considered waste, but disposal of these fines is expensive and energy-inefficient. The processes and compositions described herein provide for an energy-efficient means of recovering and recycling carbonaceous fines isolated from the gas-entrained carbonaceous fines in the crude gas stream from the gasification of a carbonaceous feedstock in a gasification reactor.

The present invention can be practiced, for example, using any of the developments to catalytic gasification technology disclosed in commonly owned US2007/0000177A1, US2007/0083072A1 and US2007/0277437A1; and U.S. patent application Ser. No. 12/178,380 (filed 23 Jul. 2008), Ser. No. 12/234,012 (filed 19 Sep. 2008) and Ser. No. 12/234,018 (filed 19 Sep. 2008). All of the above are incorporated by reference herein for all purposes as if fully set forth.

Moreover, the present invention can be practiced in conjunction with the subject matter of the following U.S. Patent Applications, each of which was filed on Dec. 28, 2008: Ser. No. 12/342,554, entitled "CATALYTIC GASIFICATION PROCESS WITH RECOVERY OF ALKALI METAL FROM CHAR"; Ser. No. 12/342,565, entitled "PETROLEUM COKE COMPOSITIONS FOR CATALYTIC GASIFICATION"; Ser. No. 12/342,578, entitled "COAL COMPOSITIONS FOR CATALYTIC GASIFICATION"; Ser. No. 12/342,596, entitled "PROCESSES FOR MAKING SYNTHESIS GAS AND SYNGAS-DERIVED PRODUCTS"; Ser. No. 12/342,608, entitled "PETROLEUM COKE COMPOSITIONS FOR CATALYTIC GASIFICATION"; Ser. No. 12/342,628, entitled "PROCESSES FOR MAKING SYNGAS-DERIVED PRODUCTS"; Ser. No. 12/342,663, entitled "CARBONACEOUS FUELS AND PROCESSES FOR MAKING AND USING THEM"; Ser. No. 12/342,715, entitled "CATALYTIC GASIFICATION PROCESS WITH RECOVERY OF ALKALI METAL FROM CHAR"; Ser. No. 12/342,736, entitled "CATALYTIC GASIFICATION PROCESS WITH RECOVERY OF ALKALI METAL FROM CHAR"; Ser. No. 12/343,143, entitled "CATALYTIC GASIFICATION PROCESS WITH RECOVERY OF ALKALI METAL FROM CHAR"; Ser. No. 12/343,149, entitled "STEAM GENERATING SLURRY GASIFIER FOR THE CATALYTIC GASIFICATION OF A CARBONACEOUS FEEDSTOCK"; and Ser. No. 12/343,159, entitled "CONTINUOUS PROCESSES FOR CONVERTING CARBONACEOUS FEEDSTOCK INTO GASEOUS PRODUCTS". All of the above are incorporated by reference herein for all purposes as if fully set forth.

Further, the present invention can be practiced in conjunction with the subject matter of the following U.S. Patent Applications, each of which was filed concurrently herewith: Ser. No. 12/395,293, entitled "PROCESSES FOR MAKING ABSORBENTS AND PROCESSES FOR REMOVING CONTAMINANTS FROM FLUIDS USING THEM"; Ser. No. 12/395,309, entitled "STEAM GENERATION PROCESSES UTILIZING BIOMASS FEEDSTOCKS"; Ser. No. 12/395,320, entitled "REDUCED CARBON FOOTPRINT STEAM GENERATION PROCESSES"; Ser. No. 12/395,330, entitled "PROCESS AND APPARATUS FOR THE SEPARATION OF METHANE FROM A GAS STREAM"; Ser. No. 12/395,344, entitled "SELECTIVE REMOVAL AND RECOVERY OF ACID GASES FROM GASIFICATION PRODUCTS"; Ser. No. 12/395,348, entitled "COAL COMPOSITIONS FOR CATALYTIC GASIFICATION"; Ser. No. 12/395,353, entitled "COAL COMPOSITIONS FOR CATALYTIC GASIFICATION"; Ser. No. 12/395,372, entitled "CO-FEED OF BIOMASS AS SOURCE OF MAKEUP CATALYSTS FOR CATALYTIC COAL GASIFICATION"; Ser. No. 12/395,381, entitled "COMPACTOR-FEEDER"; Ser. No. 12/395,429, entitled "BIOMASS CHAR COMPOSITIONS FOR CATALYTIC GASIFICATION"; Ser. No. 12/395,433, entitled "CATALYTIC GASIFICATION PARTICULATE COMPOSITIONS"; and Ser. No. 12/395,447, entitled "BIOMASS COMPOSITIONS FOR CATALYTIC GASIFICATION". All of the above are incorporated herein by reference for all purposes as if fully set forth.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present invention be limited to the specific values recited when defining a range.

When the term "about" is used in describing a value or an end-point of a range, the invention should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting.

Carbonaceous Fines Recovery

The invention relates to carbonaceous fines material recovered during gasification which is present as gas-entrained carbonaceous fines in the gasification reactor and in the crude gas stream exiting the gasification reactor. In an aspect, the invention provides for a particulate composition comprising the carbonaceous fines material, a particulate carbonaceous feedstock which is not carbonaceous fines and which is suitable for gasification in a fluidized bed zone, and a gasification catalyst. The particulate composition has a particle distribution size suitable for gasification. The gasification catalyst can be any known gasification catalyst as described herein. In one embodiment the catalyst comprises a source of at least one alkali metal in an amount to provide a ratio ranging from about 0.01 to about 0.08 of alkali metal atoms to carbon atoms.

For purposes of this invention, the term "carbonaceous fines," "entrained carbonaceous fines," or "gas-entrained carbonaceous fines," material means carbonaceous particles generated from a carbonaceous feedstock during the gasification process that are unreacted or residual carbonaceous particles (i.e., particles which did not participate fully in the gasification reaction). Entrained carbonaceous fines material derives from a gasification process, such as described above, and is present within the gasification reactor and in the crude product gas stream. Advantageously, the carbonaceous fines material comprises a gasification catalyst, which is present from a prior catalyst loading step of a carbonaceous feedstock from which the carbonaceous fines material was generated. The carbonaceous fines material can vary in size, typically having an average particle size of about 45 microns or less, and usually predominantly in the range of from about 5 microns to about 50 microns, or from about 10 microns to about 45 microns.

The gas-entrained carbonaceous fines material generated during the gasification process (e.g., within the gasification reactor and the raw product gas mixture) can be captured by any method commonly practiced in the art. For example, industrial fluidized bed reactors commonly use a separator, such as one or more pairs of cyclone separators, each pair having a primary cyclone discharging into a secondary cyclone. The raw product gas passes into the primary cyclone where the bulk of the entrained fines are captured. The outlet of the primary cyclone discharges into the secondary cyclone carrying the most finely-sized particles which escape capture in the primary cyclone. Alternatively, the gas-entrained carbonaceous fines material can be captured using particulate capture devices such as wet gas scrubbers (e.g., Venturi scrubbers); tertiary cyclones; precipitators, including for example electrostatic precipitators; screen mesh materials known in the art, for example, brass, copper, aluminum, steel, woven wire, and galvanized wire, with mesh sizes from 7 to 500 (Screen Technology Group, Inc., Washougal, Wash.); or filters, including for example ceramic, metallic or baghouse filters (see U.S. Pat. No. 7,309,383 and U.S. Pat. No. 2,934, 494). Subsequent to capture, the carbonaceous fines material can be transported by a combination of gravity and low velocity gas flow to a collection vessel, and stored until used to make the particulate composition of the invention.

In an embodiment, the carbonaceous fines material is isolated from the gas-entrained fines present in the crude gas stream exhausting from a gasification reactor. In such an embodiment, for example, cyclone separators can be located internally or externally to the gasification reactor or located both internally and externally, optionally followed by one or more Venturi scrubbers, tertiary cyclones and/or candle filters.

Particulate Composition including Recycled Fines and other Carbonaceous Material In an aspect, the recycled carbonaceous fines material is used to form a particulate composition of the invention. The particulate composition has a particle distribution size suitable for gasification in a fluidized bed zone, and includes a mixture of at least two types of carbonaceous materials. The first carbonaceous material is carbonaceous fines material recovered from a gasification reaction as described herein. The second carbonaceous material is a particulate carbonaceous feedstock material that can be derived from any carbonaceous composition as described herein, including biomass. The particulate composition includes a gasification catalyst in an amount effective to allow for gasification of the composition under appropriate temperatures and pressures. In one embodiment, the carbonaceous fines material and the particulate carbonaceous feedstock are present in the particulate composition at a weight ratio of from about 5:95 to about 95:5.

The particulate composition comprising at least some amount of carbonaceous fines material is useable as a carbonaceous gasification feedstock. During the gasification process the particulate composition has better fluidic properties when compared to a feedstock that does not comprise carbonaceous fines material. In an embodiment, the weight ratio of the amount of carbonaceous fines material to the particulate (non-fines) carbonaceous feedstock material is from about 1:99, or from about 5:95, or from about 1:10, to about 99:1, or to about 95:5, or to about 10:1, or to about 5:1, or to about 1:1, or to about 1:2, or to about 1:5.

The term "carbonaceous composition," "carbonaceous feedstock," "particulate carbonaceous feedstock," or "carbonaceous material" as used herein includes a carbon source, typically coal, petroleum coke, asphaltene and/or liquid petroleum residue, but may broadly include any source of carbon suitable for gasification, including biomass. Many particulate carbonaceous feedstocks will generally include at least some ash, typically at least about 3 wt % ash (based on the weight of the carbonaceous composition), although some contain very little ash as indicated below.

The term "petroleum coke" as used herein includes both (i) the solid thermal decomposition product of high-boiling hydrocarbon fractions obtained in petroleum processing (heavy residues—"resid petcoke") and (ii) the solid thermal decomposition product of processing tar sands (bituminous sands or oil sands—"tar sands petcoke"). Such carbonization products include, for example, green, calcined, needle and fluidized bed petroleum coke.

Resid petcoke can be derived from a crude oil, for example, by coking processes used for upgrading heavy-gravity residual crude oil, which petroleum coke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes predominantly comprises materials such as compounds of silicon and/or aluminum.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % percent inorganic compounds, based on the weight of the petroleum coke.

The term "asphaltene" as used herein is an aromatic carbonaceous solid at room temperature, and can be derived, from example, from the processing of crude oil and crude oil tar sands.

The term "liquid petroleum residue" as used herein includes both (i) the liquid thermal decomposition product of high-boiling hydrocarbon fractions obtained in petroleum processing (heavy residues—"resid liquid petroleum residue") and (ii) the liquid thermal decomposition product of processing tar sands (bituminous sands or oil sands—"tar sands liquid petroleum residue"). The liquid petroleum residue is substantially non-solid; for example, it can take the form of a thick fluid or a sludge.

Resid liquid petroleum residue can also be derived from a crude oil, for example, by processes used for upgrading heavy-gravity crude oil distillation residue. Such liquid petroleum residue contains ash as a minor component, typically about 1.0 wt % or less, and more typically about 0.5 wt % of less, based on the weight of the residue. Typically, the ash in such lower-ash residues predominantly comprises metals such as nickel and vanadium.

Tar sands liquid petroleum residue can be derived from an oil sand, for example, by processes used for upgrading oil sand. Tar sands liquid petroleum residue contains ash as a minor component, typically in the range of about 2 wt % to about 12 wt %, and more typically in the range of about 4 wt % to about 12 wt %, based on the overall weight of the residue. Typically, the ash in such higher-ash residues predominantly comprises materials such as compounds of silicon and/or aluminum.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on total coal weight. Examples of useful coals include, but are not limited to, Illinois #6, Pittsburgh #8, Beulah (N.D.), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art [see, for example, *Coal Data: A Reference*, Energy Information Administration, Office of Coal, Nuclear, Electric and Alternate Fuels, U.S. Department of Energy, DOE/EIA-0064(93), February 1995].

The term "ash" as used herein includes inorganic compounds that occur within the carbon source. The ash typically includes compounds of silicon, aluminum, calcium, iron, vanadium, sulfur, and the like. Such compounds include inorganic oxides, such as silica, alumina, ferric oxide, etc., but may also include a variety of minerals containing one or more of silicon, aluminum, calcium, iron, and vanadium. The term "ash" may be used to refer to such compounds present in the carbon source prior to gasification, and may also be used to refer to such compounds present in the char after gasification.

Catalytic Gasification Methods

The recycling and recovery methods of the present invention are particularly useful in integrated gasification processes for converting carbonaceous feedstocks, such as petroleum coke, liquid petroleum residue and/or coal to combustible gases, such as methane. The gasification reactors for such processes are typically operated at moderately high pressures and temperature, requiring introduction of a carbonaceous material (i.e., a feedstock) to the reaction zone of the gasification reactor while maintaining the required temperature, pressure, and flow rate of the feedstock. Those skilled in the art are familiar with feed systems for providing feedstocks to high pressure and/or temperature environments, including, star feeders, screw feeders, rotary pistons, and lock-hoppers. It should be understood that the feed system can include two or more pressure-balanced elements, such as lock hoppers, which would be used alternately.

The catalyzed feedstock is provided to the catalytic gasifier from a feedstock preparation operation, as discussed below. In some instances, the particulate composition can be prepared at pressures conditions above the operating pressure of gasification reactor. Hence, the particulate composition can be directly passed into the gasification reactor without further pressurization.

Any of several catalytic gasifiers can be utilized. Suitable gasification reactors include counter-current fixed bed, co-current fixed bed, fluidized bed, entrained flow, and moving bed reactors. A catalytic gasifier for gasifying liquid feeds, such as liquid petroleum residues, is disclosed in previously incorporated U.S. Pat. No. 6,955,695.

The gasification reactor typically will be operated at moderate temperatures of at least about 450° C., or of at least about 600° C. or above, to about 900° C., or to about 750° C., or to about 700° C.; and at pressures of at least about 50 psig, or at least about 200 psig, or at least about 400 psig, to about 1000 psig, or to about 700 psig, or to about 600 psig.

The gas utilized in the gasification reactor for pressurization and reactions of the particulate composition typically comprises steam, and optionally, oxygen or air, and is supplied to the reactor according to methods known to those skilled in the art. For example, any of the steam boilers known to those skilled in the art can supply steam to the reactor. Such boilers can be powered, for example, through the use of any carbonaceous material such as powdered coal, biomass etc., and including but not limited to rejected carbonaceous materials from the particulate composition preparation operation (e.g., fines, supra). Steam can also be supplied from a second gasification reactor coupled to a combustion turbine where the exhaust from the reactor is thermally exchanged to a water source and produce steam. Alternatively, the steam may be provided to the gasification reactor as described in previously incorporated U.S. patent application Ser. No. 12/395,309, entitled "STEAM GENERATION PROCESSES UTILIZING BIOMASS FEEDSTOCKS", and Serial No. 12/395,320, entitled "REDUCED CARBON FOOTPRINT STEAM GENERATION PROCESSES".

Recycled steam from other process operations can also be used for supplying steam to the reactor. For example, in the preparation of the catalyzed feedstock, when slurried particulate composition are dried with a fluid bed slurry drier, as discussed below, then the steam generated can be fed to the catalytic gasification reactor.

The small amount of required heat input for the catalytic coal gasification reaction can be provided by superheating a gas mixture of steam and recycle gas feeding the gasification reactor by any method known to one skilled in the art. In one method, compressed recycle gas of CO and $H_2$ can be mixed with steam and the resulting steam/recycle gas mixture can be further superheated by heat exchange with the gasification reactor effluent followed by superheating in a recycle gas furnace.

A methane reformer can be included in the process to supplement the recycle CO and $H_2$ fed to the reactor to ensure that enough recycle gas is supplied to the reactor so that the net heat of reaction is as close to neutral as possible (only slightly exothermic or endothermic), in other words, that the reaction is run under thermally neutral conditions. In such instances, methane can be supplied for the reformer from the methane product, as described below.

Reaction of the particulate composition under the described conditions typically provides a crude product gas and a char. The char produced in the gasification reactor during the present processes typically is removed from the gasification reactor for sampling, purging, and/or catalyst recovery. Methods for removing char are well known to those skilled in the art. One such method taught by EP-A-0102828, for example, can be employed. The char can be periodically withdrawn from the gasification reactor through a lock hopper system, although other methods are known to those skilled in the art.

The char can be quenched with recycle gas and water and directed to a catalyst recycling operation for extraction and reuse of the alkali metal catalyst. Particularly useful recovery and recycling processes are described in U.S. Pat. No. 4,459,138, as well as previously incorporated U.S. Pat. No. 4,057,512 and US2007/0277437A1, and previously incorporated U.S. patent application Ser. Nos. 12/342,554, 12/342,715, 12/342,736 and 12/343,143. Reference can be had to those documents for further process details.

Crude product gas effluent leaving the gasification reactor can pass through a portion of the gasification reactor which serves as a disengagement zone where particles too heavy to be gas-entrained in the gas leaving the gasification reactor (i.e., non gas-entrained fines material) are returned to the fluidized bed. The disengagement zone can include one or more internal cyclone separators or similar devices for removing gas-entrained carbonaceous fines material and other particulates from the gas. The crude gas effluent stream passing through the disengagement zone and leaving the gasification reactor generally contains $CH_4$, $CO_2$, $H_2$ and CO, $H_2S$, $NH_3$, unreacted steam, gas-entrained carbonaceous fines, and other contaminants such as COS.

The gas stream from which the fines have been removed can then be passed through a heat exchanger to cool the gas and the recovered heat can be used to preheat recycle gas and generate high pressure steam. Residual gas-entrained carbonaceous fines can be removed by any suitable means, as discussed above, such as external cyclone separators optionally followed by Venturi scrubbers. In addition to being recycled to the feedstock preparation, a portion of the recovered carbonaceous fines can be processed to recover alkali metal catalyst.

The gas stream from which the fines have been removed can be fed to COS hydrolysis reactors for COS removal (sour process) and further cooled in a heat exchanger to recover residual heat prior to entering water scrubbers for ammonia recovery, yielding a scrubbed gas comprising at least $H_2S$, $CO_2$, CO, $H_2$, and $CH_4$. Methods for COS hydrolysis are known to those skilled in the art, for example, see U.S. Pat. No. 4,100,256.

The residual heat from the scrubbed gas can be used to generate low pressure steam. Scrubber water and sour process condensate can be processed to strip and recover $H_2S$, $CO_2$ and $NH_3$; such processes are well known to those skilled in the art. $NH_3$ can typically be recovered as an aqueous solution (e.g., 20 wt %).

A subsequent acid gas removal process can be used to remove $H_2S$ and $CO_2$ from the scrubbed gas stream by a physical absorption method involving solvent treatment of the gas to give a cleaned gas stream. Such processes involve contacting the scrubbed gas with a solvent such as monoethanolamine, diethanolamine, methyldiethanolamine, diisopropylamine, diglycolamine, a solution of sodium salts of amino acids, methanol, hot potassium carbonate or the like. One method can involve the use of SELEXOL® (UOP LLC, Des Plaines, Ill. USA) or RECTISOL® (Lurgi AG, Frankfurt am Main, Germany) solvent having two trains; each train consisting of an $H_{2S}$ absorber and a $CO_2$ absorber. The spent solvent containing $H_2S$, $CO_2$ and other contaminants can be regenerated by any method known to those skilled in the art, including contacting the spent solvent with steam or other stripping gas to remove the contaminants or by passing the spent solvent through stripper columns. Recovered acid gases can be sent for sulfur recovery processing; for example, any recovered $H_{2S}$ from the acid gas removal and sour water stripping can be converted to elemental sulfur by any method known to those skilled in the art, including the Claus process. Sulfur can be recovered as a molten liquid. Stripped water can be directed for recycled use in preparation of the first and/or second carbonaceous feedstock. One method for removing acid gases from the scrubbed gas stream is described in previously incorporated U.S. patent application Ser. No. 12/395,344, entitled "SELECTIVE REMOVAL AND RECOVERY OF ACID GASES FROM GASIFICATION PRODUCTS".

The cleaned gas stream can be further processed to separate and recover $CH_4$ by any suitable gas separation method known to those skilled in the art including, but not limited to, cryogenic distillation and the use of molecular sieves or ceramic membranes. One method for separating and recovering methane from the cleaned gas stream are described in previously incorporated U.S. patent application Ser. No. 12/395,330, entitled "PROCESS AND APPARATUS FOR THE SEPARATION OF METHANE FROM A GAS STREAM".

Typically, two gas streams can be produced by the gas separation process, a methane product stream and a syngas stream ($H_2$ and CO). The syngas stream can be compressed and recycled to the gasification reactor. If necessary, a portion of the methane product can be directed to a reformer, as discussed previously and/or a portion of the methane product can be used as plant fuel.

Catalyst-Loaded Carbonaceous Feedstock

The particulate composition is generally loaded with an amount of an alkali metal compound. Typically, the quantity of the alkali metal compound in the composition is sufficient to provide a ratio of alkali metal atoms to carbon atoms ranging from about 0.01, or from about 0.02, or from about 0.03, or from about 0.04, to about 0.06, or to about 0.07, or to about 0.08. Further, the alkali metal is typically loaded onto a carbon source to achieve an alkali metal content of from about 3 to about 10 times more than the combined ash content of the carbonaceous material (e.g., coal and/or petroleum coke), on a mass basis.

Alkali metal compounds suitable for use as a gasification catalyst include compounds selected from the group consisting of alkali metal carbonates, bicarbonates, formates, oxalates, amides, hydroxides, acetates, halides, nitrates, sulfides, and polysulfides. For example, the catalyst can comprise one or more of $Na_2CO_3$, $K_2CO_3$, $Rb_2CO_3$, $Li_2CO_3$, $Cs_2CO_3$, NaOH, KOH, RbOH, or CsOH, and particularly, potassium carbonate and/or potassium hydroxide.

Any methods known to those skilled in the art can be used to associate one or more gasification catalysts with the particulate composition. Such methods include, but are not limited to, admixing with a solid catalyst source and impregnating the catalyst onto a carbonaceous material. Several impregnation methods known to those skilled in the art can be employed to incorporate the gasification catalysts. These methods include, but are not limited to, incipient wetness impregnation, evaporative impregnation, vacuum impregnation, dip impregnation, and combinations of these methods. Gasification catalysts can be impregnated into the carbonaceous material (e.g., particulate carbonaceous feedstock) by slurrying with a solution (e.g., aqueous) of the catalyst.

In some cases, a second catalyst (e.g., co-catalyst) or other additive can be provided; in such instances, the particulate can be treated in separate processing steps to provide the catalyst and co-catalyst/additive. For example, the primary gasification catalyst can be supplied (e.g., a potassium and/or sodium source), followed by a separate treatment to provide a co-catalyst source.

That portion of the particulate carbonaceous feedstock of a particle size suitable for use in the gasifying reactor can then be further processed, for example, to impregnate one or more catalysts and/or co-catalysts by methods known in the art, for example, as disclosed in previously incorporated U.S. Pat. No. 4,069,304, U.S. Pat. No. 4,092,125, U.S. Pat. No. 4,468,231, U.S. Pat. No. 4,551,155 and U.S. Pat. No. 5,435,940; and previously incorporated U.S. patent applications Ser. Nos. 12/234,012, 12/234,018, 12/342,565, 12/342,578, 12/342,608 and 12/343,159.

One particular method suitable for combining coal with a gasification catalyst to provide a catalyzed carbonaceous feedstock where the catalyst has been associated with the coal particulate via ion exchange is described in previous incorporated U.S. patent application Ser. No. 12/178,380. The catalyst loading by ion exchange mechanism is maximized (based on adsorption isotherms specifically developed for the coal), and the additional catalyst retained on wet including those inside the pores is controlled so that the total catalyst target value is obtained in a controlled manner. Such loading provides a catalyzed coal particulate as a wet cake. The catalyst loaded and dewatered wet coal cake typically contains, for example, about 50% moisture. The total amount of catalyst loaded is controlled by controlling the concentration of catalyst components in the solution, as well as the contact time, temperature and method, as can be readily determined by those of ordinary skill in the relevant art based on the characteristics of the starting coal.

The catalyzed feedstock can be stored for future use or transferred to a feed operation for introduction into the gasification reactor. The catalyzed feedstock can be conveyed to storage or feed operations according to any methods known to those skilled in the art, for example, a screw conveyer or pneumatic transport.

Process for Preparing Particulate Composition

In another aspect the invention provides a process for preparing a particulate composition as described above. The process comprises providing a particulate carbonaceous feedstock material (i.e., other than carbonaceous fines) and contacting that material with an aqueous medium to form a slurry. In an embodiment, the aqueous medium can comprise a gasification catalyst in an amount and under conditions sufficient to effectively load the catalyst onto the particulate carbonaceous material. The slurry is subjected to a dewatering step, which is performed using any method known in the art such as, for example, filtration (e.g., drum filter), centrifugation, or high frequency vibrating bed. The dewatering step forms a wet cake of the particulate carbonaceous material. Particulate carbonaceous fines material and wet cake are combined and mixed using any mixing apparatus known in the art (e.g., commercial mixers, extruders, or kneaders) which forms a wet particulate composition. The resulting wet particulate composition can be dried by any known method (e.g., thermal treatment, thermal treatment with an inert gas, superheated steam treatment) to form the particulate composition of the invention, which is useable a carbonaceous feedstock. While the moisture content of the resulting particulate composition can vary, in one embodiment the drying step provides a particulate composition with moisture content of about 10% or less (i.e., about 9% or less, about 8% or less, about 7% or less, about 6% or less, about 5% or less, about 4% or less, about 3% or less, about 2% or less, about 1% or less) by weight, based on the weight of the particulate composition. In another embodiment, the drying step provides a particulate composition with moisture content of less than about 4% by weight.

Because the recycled gas-entrained carbonaceous fines material is advantageously preloaded with gasification catalyst (i.e., from a catalyst loading step performed on the feedstock from which the fines are generated), gasification catalyst is only required to be loaded onto the second carbonaceous feedstock (i.e., the particulate carbonaceous feedstock). The gasification catalyst can comprise any gasification catalyst as known in the art and as described herein, and is present in an amount sufficient to provide, in the particulate composition, a ratio of alkali metal atoms to carbon atoms ranging from 0.01 to about 0.08.

Continuous Process for Converting Recycle Fines into Gaseous Products

The invention provides a process for the continuous conversion of carbonaceous feedstock into a plurality of gaseous products, where the process comprises preparing a particulate composition in accordance with the invention, or in accordance with the preparation process of the invention. The particulate composition is supplied to a gasification reactor, where gas-entrained carbonaceous fines are generated during the gasification process, but do not undergo gasification. Thus, these gas-entrained carbonaceous fines also comprise gasification catalyst and can be mixed into any other carbonaceous feedstock(s) that is also loaded with gasification catalyst to form a feedstock for gasification that comprises recycled carbonaceous fines.

The particulate composition supplied to the gasification reactor having a particle size ranging from about 10 microns to about 2500 microns.

In this aspect, the carbonaceous fines material is used in a continuous process for converting a carbonaceous feedstock into a plurality of gaseous products, through a series of steps which recover and recycle the entrained carbonaceous fines generated during the gasification process. By supplying an initial carbonaceous feedstock and a gasification catalyst to a gasification reactor equipped with internal and/or external fines removers and reacting the carbonaceous feedstock comprising recycled gas-entrained carbonaceous fines, a first gas stream is generated. The gas stream comprises the gaseous products of a gasification reaction, as described above, as well as gas-entrained carbonaceous fines material. The entrained fines material is separated from the gaseous products using the internal and/or external fines removers, producing a recoverable gas stream which comprises a predominant amount of a gaseous product. The captured gas-entrained carbonaceous fines material, which is unreacted and loaded with catalyst, is recovered from the internal and/or external fines removers. Once recovered, the carbonaceous fines material can be prepared for mixture with another carbonaceous feedstock comprising a carbonaceous material other than carbonaceous fines (e.g., a particulate carbonaceous feedstock material). Typically, the recovered carbonaceous fines have been dried during the gasification reaction and comprise gasification catalyst. In some embodiments the recovered carbonaceous fines can subjected to an additional drying step to remove residual moisture from the recovery process. The carbonaceous material other than fines can be loaded with gasification catalyst either before or after it is combined with the recovered carbonaceous fines. In an embodiment, the carbonaceous material other than fines is loaded with gasification catalyst, as described herein, recovered as a wet cake and combined with the recovered carbonaceous fines material, for example, through a kneading or similar mixing process and used to generate the particulate composition of the invention. The "continuous" carbonaceous feedstock comprises recovered gas-entrained carbonaceous fines material in an amount to maintain the steady-state operational gasification efficiency. While the carbonaceous feedstock can comprise any carbonaceous material as described herein, in certain embodiments the carbonaceous feedstock and the gasification catalyst are supplied as a particulate composition of the invention. The amount of gasification catalyst used in this process can vary as described herein, and in certain embodiments the particulate composition comprises about 15 wt % gasification catalyst.

We claim:

1. A particulate composition having a particle distribution size suitable for gasification in a fluidized bed zone, the particulate composition comprising an intimate mixture of:
    (a) a carbonaceous fines material having an average particle size of less than about 45 microns;
    (b) a particulate carbonaceous feedstock material having a particle distribution size suitable for gasification in a fluidized bed zone; and
    (c) a gasification catalyst which, in the presence of steam and under suitable temperature and pressure, exhibits gasification activity such that a plurality of gases comprising methane and one or more gases selected from the group consisting of hydrogen, carbon monoxide, carbon dioxide, hydrogen sulfide, ammonia and other higher hydrocarbons are formed from the particulate composition, wherein:
    (1) the carbonaceous fines material and particulate carbonaceous feedstock are present in the particulate composition at a weight ratio of from about 1:99 to about 99:1;
    (2) the carbonaceous fines material is physically associated with the particulate carbonaceous feedstock;
    (3) the carbonaceous fines material and the particulate carbonaceous feedstock each comprise a gasification catalyst;
    (4) the gasification catalyst comprises a source of at least one alkali metal and is present in an amount sufficient to provide, in the particulate composition, a ratio of alkali metal atoms to carbon atoms ranging from 0.01 to about 0.08; and
    (5) the particulate composition has a particle size ranging from about 10 microns to about 2500 microns.

2. The particulate composition according to claim 1, wherein the alkali metal comprises potassium, sodium or both.

3. The particulate composition according to claim 1, wherein the alkali metal is potassium.

4. The particulate composition according to claim 1, wherein the particulate carbonaceous fines material comprises particles predominantly in the range of from about 5 microns to about 50 microns.

5. A process for preparing a particulate composition having a particle distribution size suitable for gasification in a fluidized bed zone, the process comprising the steps of:
    (a) providing a particulate carbonaceous fines material having an average particle size of less than about 45 microns and comprising a gasification catalyst;
    (b) providing a particulate carbonaceous feedstock material having a particle distribution size suitable for gasification in a fluidized bed zone;
    (c) contacting the particulate carbonaceous feedstock material with an aqueous medium comprising a gasification catalyst to form a slurry;
    (d) dewatering the slurry to form a wet cake;
    (e) mixing the particulate carbonaceous fines material with the wet cake to form a wet particulate composition; and
    (f) thermally treating the wet particulate composition to form a particulate composition, wherein the gasification catalyst comprises a source of at least one alkali metal and is present in an amount sufficient to provide, in the particulate composition, a ratio of alkali metal atoms to carbon atoms ranging from 0.01 to about 0.08, and wherein the particulate composition has a particle size ranging from about 10 microns to about 2500 microns.

6. The process according to claim 5, wherein the alkali metal gasification catalyst comprises potassium, sodium or both.

7. The process according to claim 5, wherein the alkali metal gasification catalyst comprises potassium.

8. A continuous process for converting a carbonaceous feedstock into a plurality of gaseous products, the process comprising:
    (a) preparing a particulate composition in accordance with claim 1;
    (b) supplying the particulate composition to a gasifying reactor, the gasifying reactor comprising an internal fines remover, an external fines remover, or both, for removing gas-entrained fines materials;
    (c) reacting the particulate composition in the gasifying reactor in the presence of steam, and under suitable temperature and pressure to form a first gas stream comprising (i) a plurality of gaseous products including methane and one or more gases selected from the group consisting of hydrogen, carbon monoxide, carbon dioxide, hydrogen sulfide, ammonia and other higher hydrocarbons; and
   (ii) a gas-entrained carbonaceous fines material;
(d) at least partially capturing the gas-entrained carbonaceous fines material in the internal fines remover, external fines remover, or both;
(e) recovering the captured carbonaceous fines materials from the internal fines remover, external fines remover, or both; and
(f) recycling the captured carbonaceous fines material to the particulate composition preparation of step (a).

9. The process according to claim 8, wherein a char is formed in step (c), and the char is removed from the gasifying reactor and sent to a catalyst recovery and recycle process.

10. The process according to claim 9, wherein the gasification catalyst comprises gasification catalyst recycled from the catalyst recovery and recycle process.

11. The process according to claim 8, wherein the particulate composition is reacted in the gasifying reactor in the presence of steam at a temperature of at least about 450° C. to about 900° C. and a pressure of at least about 50 psig to about 1000 psig to form the first gas stream.

* * * * *